US011015420B2

(12) United States Patent
Abdeldaim (10) Patent No.: US 11,015,420 B2
(45) Date of Patent: May 25, 2021

(54) AUTOMATIC PUMP CONTROL (71) Applicant: Baker Hughes, a GE Company, LLC, Houston, TX (US)

(72) Inventor: Rawshan Monier Abdeldaim, Salmiya (KW)

(73) Assignee: BAKER HUGHES HOLDINGS LLC, Houston, TX (US)

(*) Notice: Subject to any disclaimer, the term of this patent is extended or adjusted under 35 U.S.C. 154(b) by 31 days.

(21) Appl. No.: 16/258,773

(22) Filed: Jan. 28, 2019

(65) Prior Publication Data
US 2020/0240248 A1 Jul. 30, 2020

(51) Int. Cl.
G05B 23/00 (2006.01)
E21B 43/12 (2006.01)
E21B 43/25 (2006.01)
F04C 2/12 (2006.01)
G01S 13/95 (2006.01)

(52) U.S. Cl.
CPC .............. E21B 43/12 (2013.01); E21B 43/25 (2013.01); F04C 2/123 (2013.01); G05B 23/00 (2013.01); G01S 13/95 (2013.01); G05B 2219/24215 (2013.01)

(58) Field of Classification Search
CPC ...... G06F 3/0484; E21B 47/12; E21B 43/128; E21B 43/25; G01V 11/002; F04C 2/123; G01N 33/2823; G05B 2219/24215; G05B 23/00
USPC ........................................................ 700/282
See application file for complete search history.

(56) References Cited

U.S. PATENT DOCUMENTS

| 5,941,305 | A | * | 8/1999 | Thrasher | E21B 43/121 166/53 |
| 6,041,856 | A | * | 3/2000 | Thrasher | E21B 43/121 166/53 |
| 9,719,024 | B2 | * | 8/2017 | Young | H04W 76/10 |
| 10,000,704 | B2 | * | 6/2018 | Young | H04W 76/10 |
| 2003/0172002 | A1 | * | 9/2003 | Spira | G06Q 10/10 705/26.1 |
| 2009/0210081 | A1 | * | 8/2009 | Sustaeta | G05B 13/02 700/99 |
| 2014/0163749 | A1 | * | 1/2014 | Phillips | G05D 7/06 700/283 |

(Continued)

FOREIGN PATENT DOCUMENTS

EP 2880405 * 12/2018 ............... G01F 1/00

Primary Examiner — Hien D Khuu
(74) Attorney, Agent, or Firm — Mintz Levin Cohn Ferris Glovsky and Popeo, P.C.

(57) ABSTRACT

Systems, methods, and a computer readable medium are provided for automatically controlling a pump in an oil production environment. Sensor data can be collected from pump machinery and can be used to generate an advisory statement identifying a change in pump operation in regard to one or more operating conditions. The advisory plan can be used to determine an optimization action plan to maintain the operation of the pump machinery with respect to the operating conditions. The optimization action plan can include an action, a parameter, and a parameter variable and can be transmitted to a computing device configured within a supervisory control and data acquisition system and coupled to the pump machinery. The computing device can execute the optimization action plan to control the pump machinery with respect to the operating conditions.

25 Claims, 4 Drawing Sheets (56) References Cited

U.S. PATENT DOCUMENTS

| | | | |
|---|---|---|---|
| 2015/0368566 A1* | 12/2015 | Young | F25J 3/08 700/273 |
| 2016/0265323 A1* | 9/2016 | Rendusara | E21B 47/0007 |
| 2016/0265341 A1* | 9/2016 | Subervie | G05B 19/416 |
| 2017/0292077 A1* | 10/2017 | Young | F25J 3/0209 |

* cited by examiner

AUTOMATIC PUMP CONTROL

BACKGROUND

An oil production environment can include multiple well sites, each configured with one or more pumping systems that are used to collect oil for further processing and distribution. The pumping systems can include a variety of machinery used in the production process. The machinery can be configured to include sensors capable of transmitting sensor data that can be used to control the operating parameters of the machinery.

Supervisory control and data acquisition (SCADA) systems can include control system architectures using computers and networked data communications to monitor and control machinery or systems of machinery based on received sensor data.

SUMMARY

In one aspect, a system for automatically controlling a pump in an oil production environment is provided herein. The system can include a supervisory control and data acquisition system configured with a plurality of computing devices, linked via a network, to monitor and control one or more pumps within an oil production environment in relation to one or more operating conditions. The system can also include a pump including a pump motor and one or more motor valves. The system can also include a first computing device, including a data processor, coupled to the pump motor and the one or more motor valves. The first computing device can be configured within the supervisory control and data acquisition system and can be interfaced to a plurality of sensors configured to monitor and control the pump in relation to the one or more operating conditions. The system can further include a second computing device, configured within the supervisory control and data acquisition system. The second computing device can include a memory storing instructions and one or more data processors configured to execute the instructions. The instructions, which, when executed, can cause the one or more data processors to perform operations comprising generating an advisory statement, based on pump sensor data collected by and transmitted from the first computing device. The advisory statement can identify a change in pump operation in regard to the one or more operating conditions. The instructions can further cause the one or more data processors to perform operations including determine an optimization action plan based on the generated advisory statement, the optimization action plan can include one or more actions, parameters, and parameter variables associated with controlling an operation of the pump motor and/or the one or more motor valves. The instructions can further cause the one or more data processors to perform operations including transmitting the optimization action plan to the first computing device, which when received can cause the first computing device to execute the optimization action plan.

In another aspect, methods for automatically controlling a pump in an oil production environment are also provided herein. In one embodiment, the method can include receiving pump sensor data, by a first computing device including a data processor. The pump sensor data can be generated by one or more sensors affixed to a pump within an oil production environment and coupled to the first computing device. The first computing device can be configured within a supervisory control and data acquisition system configured with a plurality of computing devices, linked via a network, to monitor and control one or more pumps within the oil production environment in relation to one or more operating conditions. The method can further include transmitting, by the first computing device, the pump sensor data to a second computing device. The second computing device can include a data processor and can be included in the supervisory control and data acquisition system. The method can also include generating an advisory statement, based on the transmitted pump sensor data, by the second computing device configured within the supervisory control and data acquisition system. The advisory statement can identify a change in pump operation in regard to the one or more operating conditions. The method can further include determining, by the second computing device, an optimization action plan based on the generated advisory statement. The optimization action plan can include one or more actions, parameters, and parameter variables associated with controlling an operation of a pump motor and/or one or more motor valves associated with the pump, the pump motor and the one or more motor valves coupled to the first computing device. The method can also include transmitting, by the second computing device, the optimization action plan to the first computing device. The method can further include executing, by the first computing device, the optimization action plan. The execution can cause the first computing device to control operation of the pump motor and the one or more motor valves based on the optimization action plan.

In another aspect, a non-transitory machine readable storage medium containing program instructions for automatically controlling a pump in an oil production environment is also provided. The program instructions contained on the machine readable storage medium can perform the method including receiving pump sensor data, by a first computing device including a data processor. The pump sensor data can be generated by one or more sensors affixed to a pump within an oil production environment and coupled to the first computing device. The first computing device can be configured within a supervisory control and data acquisition system configured with a plurality of computing devices, linked via a network, to monitor and control one or more pumps within the oil production environment in relation to one or more operating conditions. The program instructions contained on the machine readable storage medium can further perform the method including transmitting, by the first computing device, the pump sensor data to a second computing device. The second computing device can include a data processor and can be included in the supervisory control and data acquisition system. The program instructions contained on the machine readable storage medium can also perform the method including generating an advisory statement, based on the transmitted pump sensor data, by the second computing device configured within the supervisory control and data acquisition system. The advisory statement can identify a change in pump operation in regard to the one or more operating conditions. The program instructions contained on the machine readable storage medium can also perform the method including determining, by the second computing device, an optimization action plan based on the generated advisory statement. The optimization action plan can include one or more actions, parameters, and parameter variables associated with controlling an operation of a pump motor and/or one or more motor valves associated with the pump. The pump motor and the one or more motor valves can be coupled to the first computing device. The program instructions contained on the machine readable storage medium can further perform the method including transmitting, by the second computing device, the optimization action plan to the first computing device. The program instructions contained on the machine readable storage medium can also perform the method including executing, by the first computing device, the optimization action plan. The execution can cause the first computing device to control operation of the pump motor and the one or more motor valves based on the optimization action plan.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Improving well production in an oil production environment can be an important goal for environment operators. Maintaining and operating refinery equipment, such as well pumps, motors, and valves, at optimal operating conditions can be used to achieve maximal oil production from a particular oil well site. Oil production environments can be configured with a large variety of machinery used to collect, process, and distribute oil. The machinery is frequently interfaced to sensors that are configured to collect sensor data pertaining to a particular operating parameter or measurement variable associated with the machinery. Typically, such sensor data can provide environment operators with insight about the production rate, equipment operating parameters, and immediate or historical performance of the well. Often sensor data is limited to data that is associated with the present or past operating conditions and provides limited insight into the future or potential capabilities of a well. Sensor data is commonly used in monitoring and control applications called advisory systems, which are frequently configured within SCADA systems.

The SCADA system can include computing devices that are networked to the machinery, sensors, and other computing devices so that the system can collect and process the sensor data in order to generate advisory data describing the operational state of the machinery being monitored. The advisory data can be generated by an advisory system that is configured on one of the computing devices in the SCADA system. The advisory system includes a memory storing logic and operating condition data that are used to evaluate sensor data received from the machinery and perform analysis regarding the current operating state of the machinery. For example, the advisory system can receive sensor data indicating that a pump is vibrating excessively and threatening the continued operation of the pump. The advisory system can generate an alarm so that operators can evaluate the sensor data and the pump operation further.

Advisory systems can be useful for indicating failure points or failure conditions that are present in the current operation of machinery, however advisory systems typically lack sufficient logic or processing capabilities to adequately control one or more machinery elements in regard to pre-determined operating conditions. Legacy advisory systems can provide indicators, such as alarms, notifications, and reports about machinery which is exceeding operational thresholds, but often these systems are not configured to translate the advisory statements into specific machinery parameters that can be applied to the machinery in order to achieve or maintain operation of machinery within the pre-determined operating conditions. By configuring legacy advisory systems to include logic and control mechanisms that can translate advisory statements into executable control signals, machinery can be automatically controlled without requiring manual intervention to estimate and tune the machinery to a specific parameter setting. As a result, the improved advisory system can automatically provide for operation of the machinery in an oil production environment at optimal oil production rates with reduced downtime and less reliance on manual resources.

The advisory systems can also utilize the sensor data to determine performance optimizations for the well or the machinery operating at the well site. For example, an advisory system can generate advisory statements indicating a production optimization that can be achieved based on the current sensor data and the operating conditions that the advisory system is monitoring. The advisory statement may indicate "Well-242: potential to generate additional 200 barrels per day by increasing pump motor speed". An engineer working at the well site may manually translate the advisory statement into one or more machinery parameters that would achieve the indicated performance increase. Determining the machinery parameters necessary to achieve the indicated performance increase can be a process of trial and error relying heavily on operator experience to efficiently determine the machinery and updated parameters. The advisory systems reliance on manual intervention to translate the advisory statements into new or modified operating parameters can create additional requirements for personnel resources and training to manually implement the advisory statement which can further increase production costs of the oil production environment.

An improved pump control system is provided herein including systems, methods, and computer-readable mediums for automatically controlling pumps in an oil production environment based on generated advisory statements. Sensor data identifying operational data associated with the machinery to which the sensors are coupled can be received by a first computing device. The first computing device can include a remote terminal unit, a field controller and a field gateway. The first computing device can be located at a well sight and can transmit the sensor data to a second computing device, which may be located remotely from the first computing device. The second computing device can be configured with a memory including a database, an advisory system and an integrator. The received sensor data is processed on the second computing device by the advisory system and advisory statements are generated. The advisory statements include messages indicating that the machinery, such as a pump, is operating above or below some pre-determined operating conditions. However, the advisory statements do not include executable control signals which can be applied to the machinery causing the machinery to account for or correct the machinery parameters that contributed to triggering the advisory statement.

The improved pump control system can include an integrator that can be configured to translate the advisory statements into an optimization action plan to be automatically applied to the specified machinery in order to achieve the performance increase identified in the advisory statement. In this way, adjustments to machine parameters can be applied quickly, or in near real-time without requiring manual translation which can be error prone, costly, and time consuming to generate. The integrator can be configured to convert the advisory statements into optimization action plans including specific machine parameters that control, for example, a pump motor speed, or a valve setting that, when transmitted and applied to the machinery, can cause the machinery to operate at the parameter settings indicated in the optimization action plan. The integrator can receive the advisory statements and translate them into an optimization action plan including control signals that can be passed back to the first computing device for subsequent application to the machinery. The first computing device can process the control signals and apply them to the appropriate piece of machinery causing the machinery to adjust operation of one or more parameters.

In this way, automatic control of a pump or other machinery configured within an oil production environment can be automatically controlled by the SCADA system which can include the improved advisory system as described herein. The improved system can reduce the requirement for manual translation of advisory statements into machinery control signals to update machinery parameters and can further enable better real-time monitoring and control compared to legacy systems. The improved system can provide cost benefits associated with the reduced manual translation of the advisory statements including reduced workforce size, reduced configuration periods for machinery parameter updates, and overall greater production from oil production environment.

Embodiments of systems and corresponding methods for automatic pump control are discussed herein. However, embodiments of the disclosure can be employed for controlling other types of machinery in an oil production environment without limit.

Figure 1:
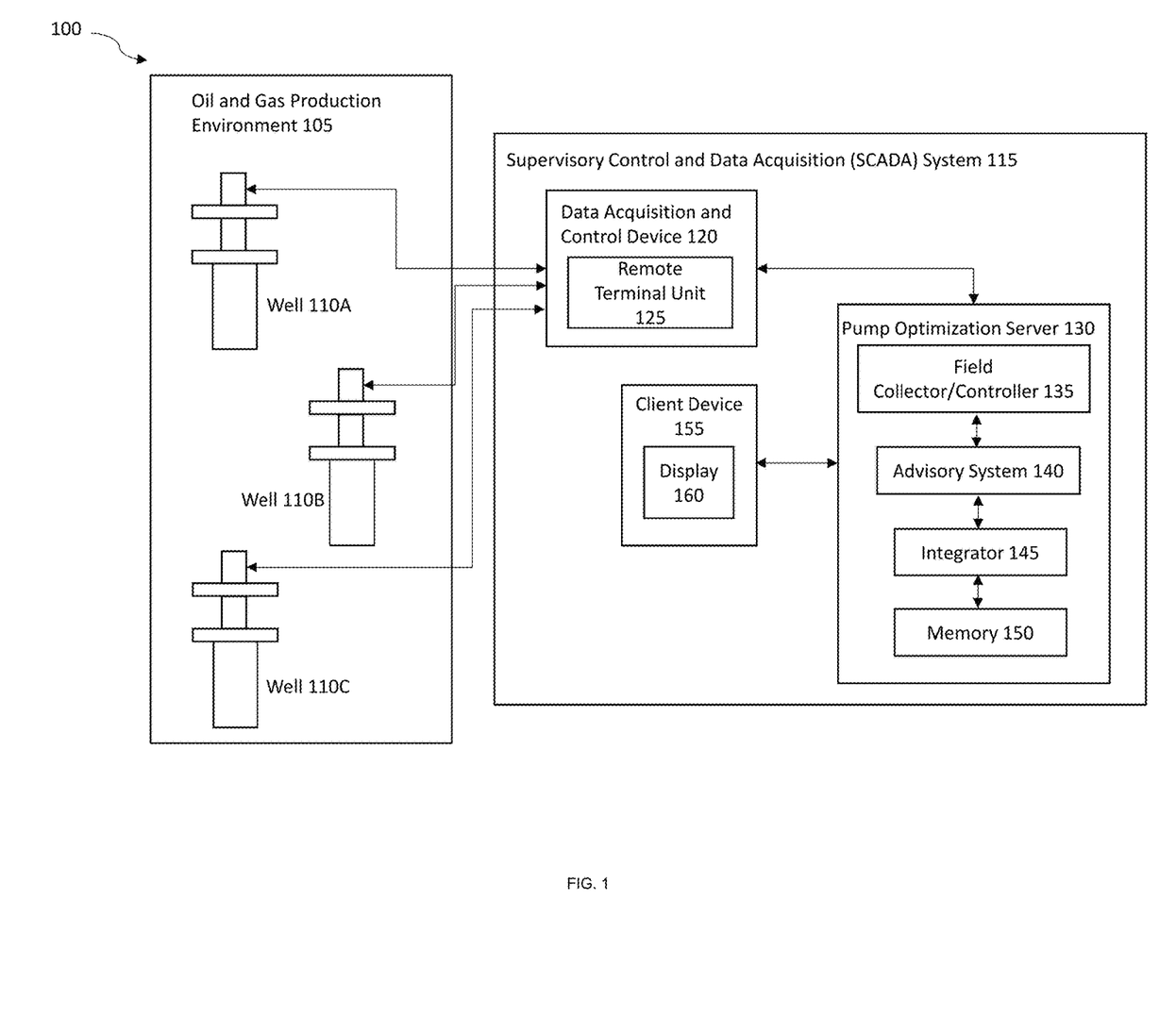
FIG. 1 is a diagram illustrating an example architecture for an automatic pump control system configured with respect to an oil production environment.

FIG. 1 is a diagram illustrating an example architecture for an automatic pump control system configured with respect to an oil production environment. The architecture 100 includes an oil production environment 105 and a supervisory control and data acquisition (SCADA) system 115 that is coupled via a network to machinery configured within the oil production environment.

The oil production environment 105 includes a plurality of wells 110, such as wells 110A-110C. The wells may be configured to generate oil and can be configured with one or more pumps that are operable to pump the oil from subsurface formations into processing systems configured to collection, process and distribute the oil further. Each of the wells 110 and the machinery associated therewith can be configured with one or more sensors to monitor various aspects of the operation of the well machinery and the well as a whole. The sensors can be coupled via a network to the SCADA system 115.

The SCADA system 115 can include a first computing device such as the data acquisition and control device 120, a pump optimization server 130, and a client device 155. The data acquisition and control device 120 can include a remote terminal unit 125. The data acquisition and control device 120 can be configured to receive sensor data from sensor-coupled machinery associated with each of the wells 110 and transmit the sensor data to the pump optimization server 130. The data acquisition and control device 120 can be located in proximity to the machinery of wells 110 and can be further configured to transmit control signals to the machinery associated with each of the wells 110. The remote terminal unit (RTU) 125 can be configured as an interface connecting the sensor-coupled machinery to the pump optimization server 130 and can be configured to apply parameter settings to the machinery at one or more well sites. The RTU 125 is a kind of data communication module that is configured to perform serial communications using the MODBUS protocol. The RTU 125 reads the data from multiple devices at the well site in real-time or near real-time and writes to some parameters if the RTU 125 receives a write command from the field controller 135.

The SCADA system 115 also includes a second computing device, such as the pump optimization server 130. In certain aspects, the pump optimization server 130 can be a cloud computing server of an infrastructure-as-a-service (IaaS) and be able to support a platform-as-a-service (PaaS) and software-as-a-service (SaaS) services. The pump optimization server 130 can be implemented remotely from the data acquisition and control device 120 and can be configured by the client device 155. The client device 155, the pump optimization server 130 and the data acquisition and control device 120 can communicate with each other via a network. The network can include, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more of the following network topologies, including a bus network, a star network, a ring network, a mesh network, a star-bus network, tree or hierarchical network, and the like.

As shown in FIG. 1, the pump optimization server 130 includes a field collector/controller 135, an advisory system 140, an integrator 145, and a memory 150. In broad terms, the pump optimization server 130 can be configured to receive the sensor data from the data acquisition and control device 120 and to process the received sensor data to generate advisory statements and optimization action plans.

The pump optimization server 130 includes a field collector/controller 135 which can collect the data from the RTUs and verifies the validity of the collected data. The field collector/controller 135 then transmits the data the field gateway, where a field gateway writes the data into a memory or database, such as the memory 150. In addition, the field collector/controller 135 can receive the action plan commands transmitted from the integrator/translator. The field collector/controller 135 can further write the action plan commands to the RTU who, in turn, may transmit the action plan to the correspondent device (e.g. the pump control drive or any of the motor valves).

The pump optimization server 130 also includes an advisory system 140. The advisory system 140 can include logic and executable instructions which can be configured to analyze the received sensor data and to compare the sensor data to parameter settings and operating conditions stored in memory 150 or a database configured within memory 150. The advisory system 140 can generate advisory statements in response to situations in which the sensor data indicates machinery is operating outside of normal operating parameters. The advisory system 140 can generate the advisory statements at a number of different advisory levels corresponding to the severity of the condition occurring at the machinery. For example, the advisory system 140 can generate advisory statements at a first level, e.g. "Level 1", which can require approval by one or more operators of the SCADA system 115 prior to the integrator 145 determining a corresponding optimization action plan. Additionally, or alternatively, the advisory system 140 can generate advisory statements at a second level, "e.g. Level 2", which can be forwarded to the integrator 145 without prior approval by one or more operators of the SCADA system 115 prior to determining a corresponding optimization action plan. In some implementations, the plurality of advisory levels can be user-configured and can include a variety of workflows associated with each of the user-configured levels. The advisory statements can also be stored in memory 150 and provided to the client device 155. For example, the memory 150 can store historical data associated with the advisory statements and can provide current and pasts advisory data to a user in the display 160 of client device 155.

As further shown in FIG. 1, the pump optimization server 115 includes an integrator 145. The integrator 145 can include logic and executable instructions which can be configured to translate advisory statements into optimization action plans corresponding to the particular machinery for which the advisory statement was generated. The optimization action plans can include one or more actions, parameters, and parameter variables associated with controlling an operation of a pump motor or one or more motor valves associated with the pump. The integrator 145 performs the translation by compiling the advisory statement into one or more action signals that are related to set points associated with one or more operating conditions. The integrator 145 translates the advisory action into an optimization action plan that can be transmitted to the data acquisition and control device 120 to further cause the optimization action plan to be applied to the pump machinery such that the operation of the pump machinery is updated in regard to the action, parameter, and parameter variable included in the optimization action plan.

The advisory statement can include a standard format that contains three sections. The sections can include an action section, a device section, and a target set point section. The integrator 145 can re-map the advisory statement sections as action signals based on the three pre-mentioned segments. In other words, the integrator 145 can read the advisory statement and can provide the data included in each of the sections to the field collector/controller 135 and subsequently to the RTU 125.

Consider the following example in which the advisory system 140 generates an advisory statement indicating that an extra 300 barrels of oil can be obtained by decreasing the well head pressure (WHP) to 250 pounds per square inch (psi). The integrator 145 processes the three sections of the advisory statement and identifies an action, "decrease", a device, "WHP", and a target set point, "250 psi". The integrator 145 can generate the optimization action plan as segmented or incremental optimization action plans that can include user-determined interval steps. For the above example, a motor valve on the WHP will be opened by 1% in 3 minute intervals until the pressure at the WHP reaches a value of 250 psi. After each adjustment interval, the system will monitor all of the performance parameters including the operation set point of the pump, the water cut and the flow rate. In the event, that the optimum operation data indicates the WHP is operating or beginning to operate outside of its desired range, the optimization action plan will be terminated immediately and provide an indication of the reason. Continuing this example, assume that after 5 adjustment intervals of opening the WHP valve, the flowrate increased, but the water cut percentage showed a bigger rate increase. This would be interpreted to indicate that if the optimization action plan continued, the final net oil rate will be lower than before because the water cut level is going to be higher than before. Hence, the optimization action plan will be terminated immediately and an indication of the reason for termination (e.g., an increase in the water cut level). On the other hand if the optimization action plan continued when the water cut level indicates an acceptable increase, but another device's desired operational values approached or were determined to have already stepped out of its optimum operational range, for example, when flow line pressure (FLP) increased, then the pump optimization server 130 can determine whether or not to open other downstream valves to release the FLP, for example by opening a valve suppling a temporary pit, followed by a valve supplying a production tank, or the like until the FLP returns to the its optimal operating range.

As shown in FIG. 1, the pump optimization server 130 includes a memory 150. The memory 150 can include a database or similar data structure that can be configured to store operating conditions, advisory statements, optimization action plans, and received sensor data. The memory 150 can include executable instructions which cause the advisory system 140 to determine a particular advisory level (e.g., Level 1 or Level 2) for a generated advisory statement. The memory 150 can also include executable instructions which cause the integrator 145 to generate optimization action plans based on the received advisory statement. In addition, the memory 150 can include executable instructions which cause the pump optimization server 130 to provide the advisory statements, optimization action plans, sensor data, and/or operating conditions to the client device 155.

As further shown in FIG. 1, the SCADA system 115 includes a client device 155. The client device 155 to which the pump optimization server 130 is connected over a network can be, for example, desktop computers, mobile computers, tablet computers, mobile devices (e.g., a smartphone or PDA), or any other devices having appropriate processor, memory, and communications capabilities. The client device 155 includes a display 160. The client device 155 can configure one or more aspects of the SCADA system 115 including the functionality associated with the data acquisition and control device 120 as well as the pump optimization server 130. The client device 155 can be any computing device that is appropriately configured to receive user inputs and to display data or executable content associated with the SCADA system 115. For example, the client device 155 can be utilized to input desired operating conditions for an oil well or oil-production machinery that is configured within the oil production environment 105. Additionally, the client device 155 can display, via display 160, the current operating conditions, historical trends associated with the operating conditions, as well as advisory statements, optimization action plans, sensor data. In some embodiments, the client device 155 can display notifications related to Level 1 advisory statements and can provide the notification to a user for approval of the advisory statement before the integrator 145 generates the corresponding optimization action plan. The client device 155 can provide SCADA system data via the display 160 in graphical and textual formats. The graphical formats can include a variety of time-based graphs plotting the operating conditions and the application intervals used for a particular optimization action plan to make the data more easily interpretable to a user. In some embodiments, the client device 155 can include a mobile computing device, such as a smart-phone, tablet, or laptop computer that is connected to the pump optimization server 130 via wireless or wired communication means.

Figure 2:
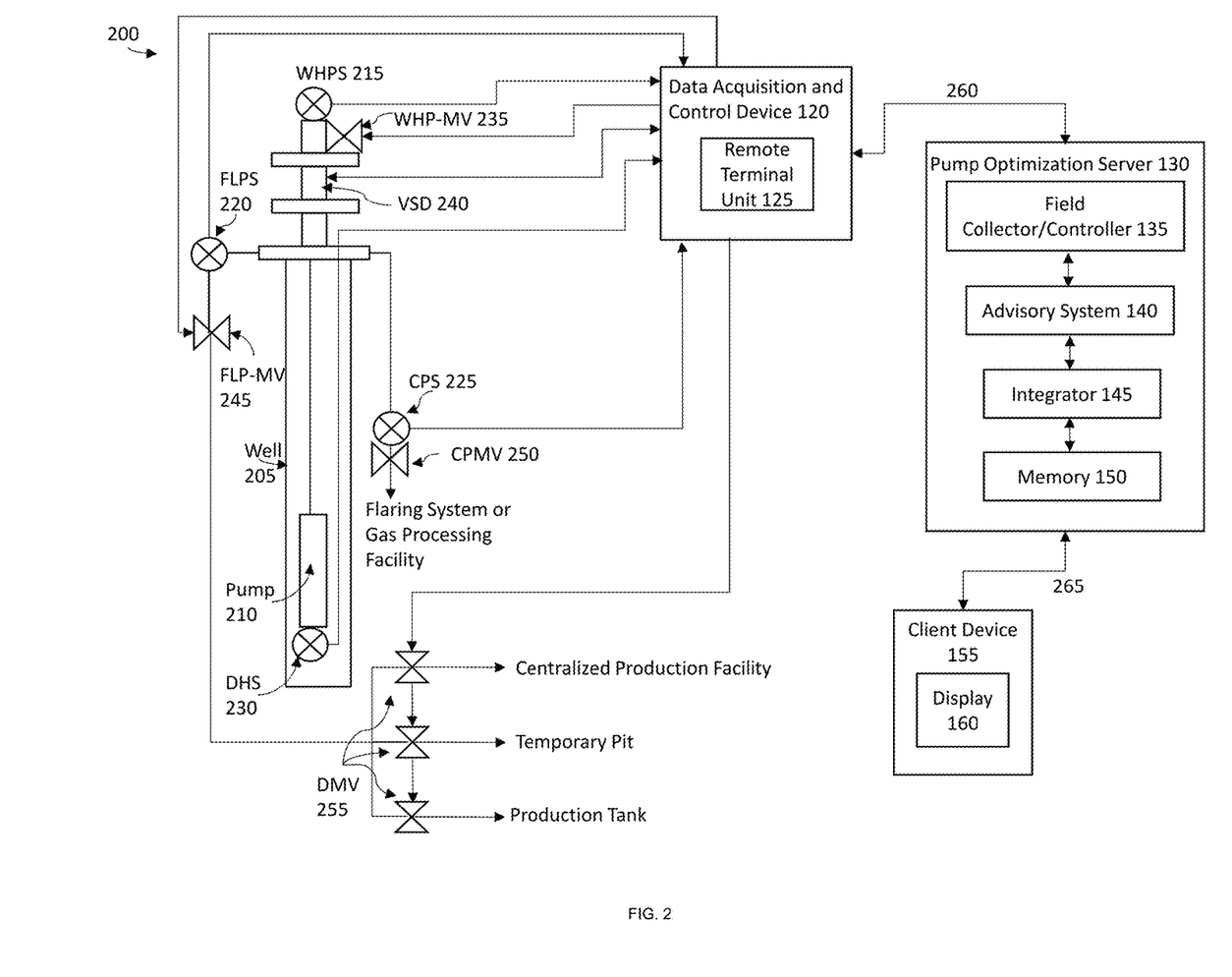
FIG. 2 is a diagram illustrating an exemplary automatic pump control system in operation with respect to a pump configured within the oil production environment.

FIG. 2 is a diagram illustrating an exemplary automatic pump control system 200 in operation with respect to an oil pump configured within the oil production environment. The remote acquisition and data control device 120, the pump optimization server 130, and the client device 155 are similar in structure and function as those shown and described in relation to FIG. 1, except where noted otherwise.

As shown in FIG. 2, the exemplary automatic pump control system 200 includes a well 205. The well 205 can be a well that is configured for oil production. The well 205 includes a pump 210. The pump 210 can include an electric submersible pump, a progressive cavity pump, a sucker rod pump, and/or the like. A number of pump components are also included in the automatic pump control system 200. For example, the system includes a number of sensors that are configured to collect and provide data about one or more aspects of the pump or the pump distribution system such as a well head pressure sensor (WHPS) 215, a flow line pressure sensor (FLPS) 220, a casing pressure sensor (CPS) 225, and a downhole sensor (DHS) 230. Additionally, the automatic pump control system 200 can include a variable speed drive that controls the speed of the pump motor and the operation pump motor, for example turning the pump motor on or off. Additional sensors may also be configured in relation to the well or the pump and can be configured to operate with the automatic pump control system 200. For example, the downhole sensor 230 can include sensors configured to measure the intake pressure and temperature, the discharge pressure and temperature, as well as the vibration characteristics of the pump 210 as it operates in the well 205.

As further shown in FIG. 2, the automatic pump control system 200 includes a number of pump motors and one or more motor valves. For example, a well head pressure motor valve 235 is configured atop the well, for example, as part of the well head configuration. The well head pressure motor valve 235 can be controlled in order to adjust the amount of pressure in the well head. The well head configuration shown in FIG. 2 also includes a variable speed drive 240. The variable speed drive 240 is a physical drive device that can be configured to operate the pump at a variety of different speeds or frequencies, such as 50 or 3600 revolutions-per-minute. The automatic pump control system 200 can also include a flow line pressure motor valve 245, a casing pressure motor valve 250 and a distribution manifold 255. The automatic pump control system 200 further includes a data acquisition and control device 120 that is coupled via a network 260 to the pump optimization server 130. Similarly the pump optimization server 130 is coupled to the client device 155 via a network 265.

In operation, the automatic pump control system 200 shown in FIG. 2, generates sensor data from one or more sensors, such as the well head pressure sensor 215, the flow line pressure sensor 220, the casing pressure sensor 225, and the downhole sensor 230. Additionally, sensor data can be provided by the variable speed drive 240 to indicate the current speed of rotation of the pump motor, amperage of the pump motor, and the voltage rates applied to the pump motor. The sensor data is received by the remote terminal unit 125 of the data acquisition and control device 120 where it is transmitted via the field collector/controller 135 to the pump optimization server 130 via network 260. The sensor data is received by the advisory system 140 where it is analyzed in regard to the predetermined operating conditions configured for the well. For example, the well may be configured with an operating condition indicating that the well should be run under a speed of 50 Hz to produce 1000 barrels of oil per day with less than 30% water cut. Water cut is a measurement of the amount of waste water necessary to produce the target production rate, for example, 1000 barrels per day.

The advisory system 140 receives the sensor data from the data acquisition and control device 120 and performs analysis of the sensor data in regard to the operating condition. The advisory system 140 can determine that the operating condition can be adjusted to produce an additional 300 barrels of oil per day by increasing the speed of the variable speed motor drive to 52.5 Hz. The advisory system 140 can determine the new operating condition based on the sensor data associated with the variable speed drive 240 as well as the downhole sensor 230 data indicating that the pump speed can be increased without causing the pump to operate outside of its acceptable tolerances. The advisory system 140 can generate an advisory statement indicating that a potential additional 300 barrels of oil per day is possible by increasing speed to 52.5 Hz. The advisory system 140 can provide the advisory statement to the integrator 145.

The integrator 145 can process the received advisory statement to generate an optimization action plan corresponding to the advisory statement. The optimization action plan can include an action, for example, "increase", an action parameter, for example, "speed", and an action parameter variable, for example, "52.5 Hz". The integrator 145 can provide the optimization action plan incrementally to the data acquisition and control device 120 for application to the well machinery identified in the optimization action plan. For example, the integrator 145 can provide a first increment of speed increase as 0.1 Hz with a configurable waiting period of 15 minutes. The data acquisition and control device 120 can apply the speed increase to the variable speed drive 240 such that the speed of the pump motor is increase by 0.1 Hz every 15 minutes. In some embodiments, additional waiting period durations can be defined by the operators of the SCADA system 115. The waiting period ensures the system is responding appropriately to the optimization action plan. During this time, the automatic pump control system 200 continues to receive sensor data and can monitor related sensor data to ensure the optimization action plan is achieving the desired operating conditions. For example, the flow rate can be further monitored to determine if it is increasing. Similarly, the water cut can be monitored to determine it does not exceed 30%, and the pump motor speed can be monitored to ensure it does not exceed its operational limits. If any one of these data points indicate the pump operation is not conforming to the inputs provided in the first adjustment increment, a second adjustment increment can be provided to further adjust the pump operation. This operation can be repeated until the system reaches the new operating conditions with no issues. The operation can also be repeated until one or more pump components exceed a maximum operating tolerance or until the water cut shows a non-linear increase (corresponding to a decrease of oil production). In any of the aforementioned conditions, the system will discontinue applying the incremental adjustments of the optimization action plan and consider the adjustments provided in the last applied increment to be the maximal adjustments that the system is capable of in regard to the operating conditions. In the event an alarm condition is determined for a different pump component, for example, an alarm indicating that the well head pressure has increased, the automatic pump control system 200 can apply a second level of control to incrementally open the well head pressure motor valves to decrease the well head pressure prior to applying further speed increases to the variable speed drive 240.

Figure 3:
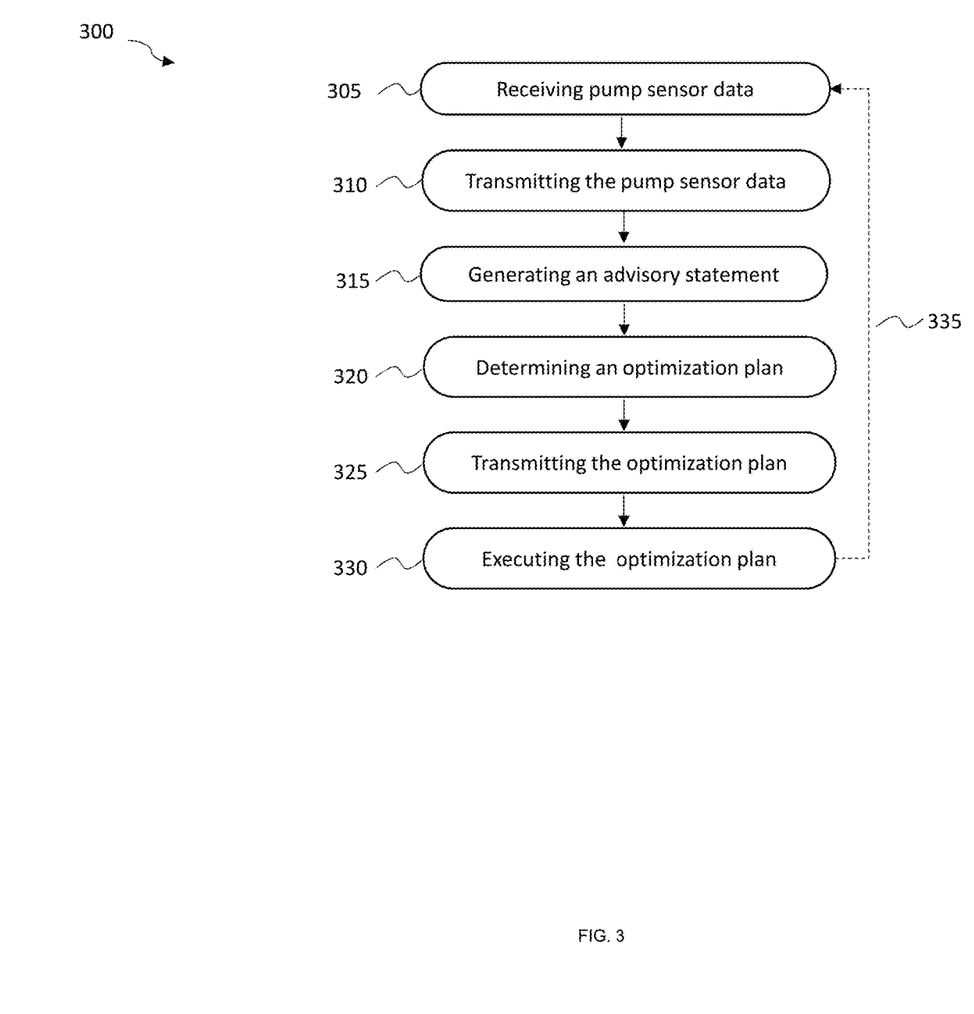
FIG. 3 is a diagram illustrating one exemplary embodiment of a method for automatically controlling a pump configured within an oil production environment using the exemplary automatic pump control system of FIG. 2.

FIG. 3 is a diagram illustrating one exemplary embodiment of a method for automatically controlling a pump configured within an oil production environment using the exemplary automatic pump control system 200 shown and described in relation to FIG. 2. In certain aspects, embodiments of the method 300 can include greater or fewer operations than illustrated in FIG. 3 and the operations can be performed in a different order than illustrated in FIG. 3.

For example, in operation 305, first computing device, such as the data acquisition and control device 120, receives pump sensor data. The sensor data can be received by a remote terminal unit 125 and forwarded to a field collector/controller 135 for transmission to the pump optimization server 130 via a field gateway. The pump sensor data can include sensor data from a well head pressure sensor, a flow line pressure sensor, a casing pressure sensor, a downhole sensor, and a pump motor speed sensor such as a variable speed drive sensor.

In operation 310, the data acquisition and control device 120 transmits the pump sensor data to a second computing device, such as the pump optimization server 130. In operation 315, the pump optimization server 130 generates an advisory statement. The advisory system 140, configured on the pump optimization server 130, processes the received pump sensor data to generate an advisory statement. The advisory statement can be generated based on comparing the received sensor data to one or more set points stored in the memory 150. Thus, the advisory statement can identify a change in pump operation by comparing the received sensor data to set points associated with one or more operating conditions. The one or more operating conditions can include a well head pressure set point, a flow line pressure set point, a pump discharge pressure set point, and/or a pump intake pressure set point. Additionally, the advisory system 140 can determine an advisory level associated with a particular advisory statement. In some embodiments, the advisory statement can be a "Level 1" advisory statement requiring approval from operators of the SCADA system 115 prior to executing an optimization action plan corresponding to the advisory statement. In other embodiments, the advisory statement can be a "Level 2" advisory statement for which no approval is required prior to determining an optimization action plan corresponding to the advisory statement. The generated advisory statements can be stored in memory 150 of the pump optimization server 130 and can be included in a graphical user interface provided via display 160 on client device 155.

In operation 320, the pump optimization server 130 determines an optimization action plan. Based on the advisory statement generated by the advisory system 140, the integrator 145 can determine an optimization action plan. The optimization action plan can include an action, a parameter associated with the action, and a parameter variable associated with controlling an operation of a pump motor or the motor valves that is associated with the pump. For example, the optimization action plan can include a pump frequency or speed parameter as well as a well head pressure parameter. The optimization action plan can include multiple variants of actions, parameters, and parameter variables that are associated with each for type of machinery that is configured within the SCADA system 115. The integrator 145 compiles the advisory statement into an optimization action plan that includes action signals that can be applied to the corresponding pump machinery. In some embodiments, the optimization action plan can include a configurable schedule, including one or more time intervals, during which incremental adjustments are applied to the pump machinery. In some embodiments, determining the optimization action plan can include determining a shutdown parameter causing the first computing device to control the pump motor to cease operation of the pump. In this way, the pump control system 200 can automatically cause the pump to cease operation upon receiving sensor data and generating an advisory statement indicating the pump is operating outside of acceptable operating conditions.

In operation 325, the pump optimization server 130 transmits the optimization action plan to the data acquisition and control device 120. In operation 330, the data acquisition and control device 120 executes the optimization action plan. Executing the optimization action plan can cause the data acquisition and control device 120 to apply the actions, parameters, and parameter variables to control the pump motor or the motor valves. In this way, the pump machinery is kept operating within the acceptable or pre-determined operating conditions. For example, executing an optimization action plan including a frequency parameter can cause the variable speed drive 240, or other similarly configured pump motor, to increase in speed or decrease in speed. Similarly, executing an optimization action plan including a well head pressure parameter can cause the well head pressure motor valves 235 to open or close. In some embodiments, executing the optimization action plan can cause the data acquisition and control device 120 to apply a forced shutdown in case of emergency, such as when the optimization action plan includes a shutdown parameter.

In operation 335, the SCADA system 115 can perform operations 305-330 iteratively based on one or more time intervals determined by the integrator 145. The integrator 145 can apply the optimization action plan incrementally at one or more user-configured time intervals. Time intervals can include intervals of minutes, such intervals that are 5-15, 15-30, 30-60, or 60-180 minutes in duration. Time intervals can further include intervals of days, such as intervals that are 0.5-1, 1-3, or 3-5 days in duration.

Figure 4:
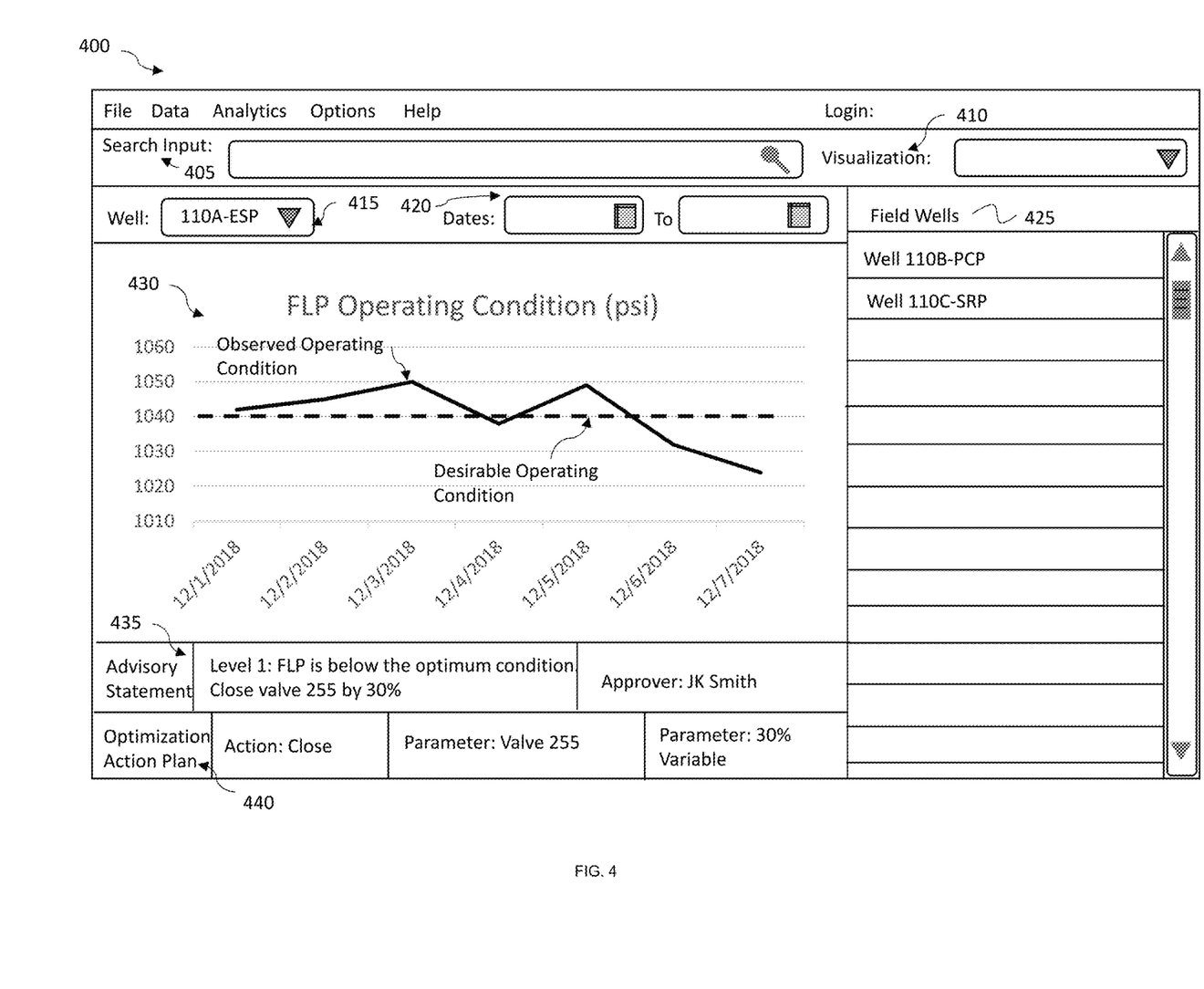
FIG. 4 is a diagram illustrating one exemplary embodiment of a graphical user interface for displaying automatic pump control system data.

FIG. 4 is a diagram illustrating one exemplary embodiment of a graphical user interface (GUI) 400 for displaying automatic pump control system data based on the exemplary automatic pump control system 200 shown and described in relation to FIG. 2. The GUI 400 can be provided to a user via display 160 on client device 155. The GUI 400 illustrated in FIG. 4 can include additional or fewer graphical affordances, which may or may not be illustrated, but are described herein. FIG. 4 can describe a GUI, such as GUI 400, configured to receive input from a user, however, the GUI 400 can also receive input from a computer via electronic communication between computers executing computer-readable instructions to provide input into the GUI 400. The GUI 400 can be configured to execute instructions, upon receipt of input from a user or a computer, which initiate processing or execution of further functionality on an electronically coupled computer that may or may not be illustrated, but is described in relation to GUI 400 of the automatic pump control system 200 illustrated in FIG. 2.

The GUI 400 shown in FIG. 4 illustrates an improved user interface for visualizing data associated with an automatic pump control system. The improved interface can include graphical affordances to provide selections for data analysis and visualization functionality associated with one or more pieces of machinery that are configured within an oil production environment. The improved interface can provide a user with increased data comprehension and enhanced data rendering and visualization in a manner that legacy SCADA systems cannot provide.

As shown in FIG. 4, the GUI 400 can be implemented in an application hosted on client device 155 or in a web-based application hosted remotely and accessed via a web browser. The GUI 400 can be implemented as a dashboard and can include menu selections for file management (e.g., "File"), data import/export/management (e.g., "Data"), executing functionality related to analytics or the advisory system 140 (e.g., "Analytics"), user and system configured preferences or options affecting the display or operation of the GUI 400 (e.g., "Options"), accessing technical documentation or interactive assistance regarding operation of the GUI 400 or the automatic pump control system 200 (e.g., "Help"), and authentication and access functionality identifying a user or administrator as a credentialed user of the GUI 400 and/or the automatic pump control system 200 (e.g., "Login").

As shown in the non-limiting examples illustrated in FIG. 4, the GUI 400 includes interface affordances such as fields, menus, selections and input mechanisms for providing multiple forms of query input via a search input 405, a visualization input 410, a well selection input 415, and a date criteria input 420. The GUI 400 includes a field well list panel 425 identifying machinery configured within the oil production environment to which the SCADA system 115 is coupled. The GUI 400 also includes a display panel 430.

As shown in FIG. 4, the display panel 430 of GUI 400 displays a dynamically updated graph of the operating condition data at different time intervals. For example, as shown for well 110A-ESP, the desirable operating condition has been established at 1040 psi, shown by the dashed line. The automatic pump control system 200 collects sensor data to generate a plot of the observed operating conditions (e.g., shown as the solid line). During the operation of the well, the automatic pump control system 200 can determine advisory statements and generate optimization action plans to ensure the observed operating conditions remain as close as possible to the desirable operating condition. As shown in FIG. 4, the observed operating conditions on Dec. 7, 2018 have dropped below the desirable FLP operating conditions to a level of 1025 psi. As a result, the automatic pump control system 200 has determined an advisory statement 435 to close the valve 255 by 30% so that the observed operating conditions can be maintained at the FLP level of 1040 psi. The advisory statement 435 indicates the advisory statement is a "Level 1" statement indicating that the optimum operation condition can be achieved by closing valve 255 by 30%. The advisory statement has been approved by "J K Smith" and, as a result of the approval, the corresponding optimization action plan 440 has been generated. The optimization action plan 440 includes the action (e.g., "Close"), the action parameter (e.g., "Valve 255"), and the parameter variable (e.g., "30%"). In this way, the automatic pump control system 200 can apply artificial intelligence to perform real-time monitoring, calculations, analysis, as well as real-time generation of optimization action plans and executable action signals.

Exemplary technical effects of the methods, systems, and devices described herein include, by way of non-limiting example, determining an optimization action plan for machinery configured within an oil production environment. By determining and applying the optimization action plan, machinery can be controlled within the desirable operating conditions automatically and without manual configuration of the machinery. Thus the system represents an improvement of computer functionality within a SCADA system that monitors and controls machinery based on the sensor data. In this way, the improved automatic pump control system 200 can provide faster, more reliable optimization instructions in order to maintain machinery operation and/or pump production as close as possible to desirable operating conditions.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving pump sensor data, by a first computing device including a data processor, the pump sensor data generated by one or more sensors affixed to a pump within an oil production environment and coupled to the first computing device, the first computing device configured within a supervisory control and data acquisition system configured with a plurality of computing devices, linked via a network, to monitor and control one or more pumps within the oil production environment in relation to one or more operating conditions;
transmitting, by the first computing device, the pump sensor data to a second computing device, including a data processor and included in the supervisory control and data acquisition system;
generating an advisory statement in real-time, based on the transmitted pump sensor data, by the second computing device configured within the supervisory control and data acquisition system, the advisory statement identifying a change in pump operation in regard to the one or more operating conditions, wherein the advisory statement includes a device description identifying a pump motor or one or more motor valves associated with the pump and coupled to the first computing device, an action description identifying an action associated with a change in operation of the pump motor or the one or more motor valves, and a target set point description identifying a set point value to implement the change in operation of the pump motor or the one or more motor valves corresponding to the action;
determining, by the second computing device, an optimization action plan in real-time based on the generated advisory statement, the optimization action plan including the action and parameters associated with controlling the operation of the pump motor or the one or more motor valves associated with the pump based on the set point value, the optimization plan including a user-defined adjustment interval defining a time interval at which the optimization plan is iteratively executed;
transmitting, by the second computing device, the optimization action plan to the first computing device;
executing, by the first computing device, the optimization action plan iteratively in-real-time based on the user-defined adjustment interval, the execution causing the first computing device to iteratively control operation of the pump motor or the one or more motor valves based on the optimization action plan; and providing the advisory statement and the optimization plan in real-time in a query-able dashboard interface configured on a display of a third computing device included in the supervisory control and data acquisition system, the dashboard interface dynamically displaying and updating in real-time at least one plot of observed operating conditions and desired operating conditions associated with the change in pump operation, the at least one plot displaying the observed operating conditions overlaid atop the desired operation conditions with respect to the user-defined adjustment interval.

2. The method of claim 1, further comprising operating the pump motor or the one or more motor valves based on the optimization action plan and the operating conditions.

3. The method of claim 1, wherein the operating conditions include a well head pressure set point, a flow line pressure set point, a pump discharge pressure set point, and/or a pump intake pressure set point.

4. The method of claim 1, wherein the parameters included in the optimization action plan include a pump frequency parameter and a well head pressure parameter.

5. The method of claim 4, wherein executing the pump frequency parameter causes the pump motor to increase speed or to decrease speed.

6. The method of claim 4, wherein the executing the well head pressure parameter causes the one or more motor valves to open or to close.

7. The method of claim 1, wherein the determining the optimization action plan includes determining a shutdown parameter causing the first computing device to control the pump motor to cease operation of the pump.

8. The method of claim 1, wherein the one or more operating conditions are stored in a memory of the second computing device and are updated based on the optimization action plan.

9. The method of claim 1, further comprises identifying, by the second computing device, the generated advisory statement as a Level 1 advisory statement or a Level 2 advisory statement prior to determining the optimization action plan.

10. The method of claim 9, wherein the identified Level 1 advisory statement is transmitted to a plurality of supervisory control and data acquisition system operators for approval prior to determining the optimization action plan.

11. The method of claim 9, wherein the optimization action plan is determined without prior approval of the identified Level 2 advisory statement by a plurality of supervisory control and data acquisition system operators.

12. The method of claim 1, wherein the advisory statement and the optimization action plan associated with the pump are stored in a memory configured on the second computing device.

13. A system comprising:
a supervisory control and data acquisition system configured with a plurality of computing devices, linked via a network, to monitor and control one or more pumps within an oil production environment in relation to one or more operating conditions;
a pump including a pump motor and one or more motor valves;
a first computing device, including a data processor, coupled to the pump motor and the one or more motor valves, the first computing device configured within the supervisory control and data acquisition system and interfaced to a plurality of sensors configured to monitor and control the pump in relation to the one or more operating conditions; and
a second computing device, configured within the supervisory control and data acquisition system, the second computing device including a memory storing instructions and one or more data processors configured to execute the instructions, which, when executed, cause the one or more data processors to perform operations comprising: generating an advisory statement in real-time, based on pump sensor data collected by and transmitted from the first computing device, the advisory statement identifying a change in pump operation in regard to the one or more operating conditions, wherein the advisory statement includes a device description identifying a pump motor or one or more motor valves associated with the pump and coupled to the first computing device, an action description identifying an action associated with a change in operation of the pump motor or the one or more motor valves, and a target set point description identifying a set point value to implement the change in operation of the pump motor or the one or more motor valves corresponding to the action;

determining an optimization action plan in real-time based on the generated advisory statement, the optimization action plan including the action and parameters associated with controlling the operation of the pump motor or the one or more motor valves based on the set point value, the optimization plan including a user defined adjustment interval defining a time interval at which the optimization plan is iteratively executed;

transmitting the optimization action plan to the first computing device, which when received will cause the first computing device to execute the optimization action plan iteratively in real-time based on the user-defined adjustment interval; and providing, the advisory statement and the optimization plan in real-time in a query-able dashboard interface configured on a display of a third computing device included in the supervisory control and data acquisition system, the dashboard interface dynamically displaying and updating at least one plot of observed operating conditions and desired operating conditions associated with the change in pump operation, the at least one plot displaying the observed operating conditions overlaid atop the desired operating conditions with respect to the user-defined adjustment interval.

14. The system of claim 13, wherein the first computing device is further configured to iteratively control the pump motor and the one or more motor valves based on iteratively executing the optimization action plan with regard to the user-defined adjustment interval and the one or more operating conditions.

15. The system of claim 13, wherein the operating conditions include a well head pressure set point, a flow line pressure set point, a pump discharge pressure set point, and/or a pump intake pressure set point.

16. The system of claim 13, wherein the parameters included in the optimization action plan include a pump frequency parameter and a well head pressure parameter.

17. The system of claim 16, wherein executing the pump frequency parameter causes the pump motor to increase speed or to decrease speed.

18. The system of claim 16, wherein executing the well head pressure parameter causes the one or more motor valves to open or to close.

19. The system of claim 13, wherein determining the optimization action plan includes determining a shutdown parameter, which when transmitted to the first computing device will cause the first computing device to execute the shutdown parameter and to control the pump motor to cease operation of the pump.

20. The system of claim 13, wherein the one or more operating conditions are stored in the memory of the second computing device and are updated based on the optimization action plan.

21. The system of claim 13, further comprises identifying, by the second computing device, the generated advisory statement as a Level 1 advisory statement or a Level 2 advisory statement prior to determining the optimization action plan.

22. The system of claim 21, wherein the Level 1 advisory statement is transmitted to a plurality of supervisory control and data acquisition system operators for approval prior to determining the optimization action plan.

23. The system of claim 21, wherein the optimization action plan is determined without prior approval of the Level 2 advisory statement by a plurality of supervisory control and data acquisition system operators.

24. The system of claim 13, wherein the advisory statement and the optimization action plan associated with the pump are stored in a memory configured on the second computing device.

25. A non-transitory machine readable storage medium containing program instructions, which when executed by a processor cause the processor to perform operations comprising:

receiving pump sensor data, by a first computing device including a data processor, the pump sensor data generated by one or more sensors affixed to a pump within an oil production environment and coupled to the first computing device, the first computing device configured within a supervisory control and data acquisition system configured with a plurality of computing devices, linked via a network, to monitor and control one or more pumps within the oil production environment in relation to one or more operating conditions;

transmitting, by the first computing device, the pump sensor data to a second computing device, including a data processor and included in the supervisory control and data acquisition system;

generating an advisory statement in real-time, based on the transmitted pump sensor data, by the second computing device configured within the supervisory control and data acquisition system, the advisory statement identifying a change in pump operation in regard to the one or more operating conditions, wherein the advisory statement includes a device description identifying a pump motor or one or more motor valves associated with the pump and coupled to the first computing device, an action description identifying an action associated with a change in operation of the pump motor or the one or more motor valves, and a target set point description identifying a set point value to implement the change in operation of the pump motor or the one or more motor valves corresponding to the action;

determining, by the second computing device, an optimization action plan in real-time based on the generated advisory statement, the optimization action plan including the action and parameters associated with controlling the operation of the pump motor or the one or more motor valves associated with the pump based on the set point value, the optimization plan including a user-defined adjustment interval defining a time interval at which the optimization plan is iteratively executed transmitting, by the second computing device, the optimization action plan to the first computing device;

executing, by the first computing device, the optimization action plan iteratively in real-time based on the user-defined adjustment interval, the execution causing the first computing device to iteratively control operation of the pump motor or the one or more motor valves based on the optimization action plan; and providing, the advisory statement and the optimization plan in real-time in a query-able dashboard interface configured on a display of a third computing device included in the supervisory control and data acquisition system, the dashboard interface dynamically displaying and updating at least one plot of observed operating conditions and desired operating conditions associated with the change in pump operation, the at least one plot displaying the observed operating conditions overlaid atop the desired operating conditions with respect to the user-defined adjustment interval.

* * * * *